United States Patent [19]

Sink

[11] Patent Number: 5,380,102
[45] Date of Patent: Jan. 10, 1995

[54] SHAFT JOURNAL BEARING ASSEMBLY IMPROVED SEAL WEAR RING

[75] Inventor: Danny R. Sink, Richmond, Va.

[73] Assignee: Brenco Incorporated, Petersburg, Va.

[21] Appl. No.: 144,511

[22] Filed: Nov. 2, 1993

[51] Int. Cl.[6] ............................................. F16C 33/78
[52] U.S. Cl. .................................. 384/484; 384/551; 384/571
[58] Field of Search ............... 384/484, 571, 486, 477, 384/551, 589

[56] References Cited

U.S. PATENT DOCUMENTS

| 3,494,682 | 2/1970 | Keller | 384/486 |
| 3,969,029 | 7/1976 | Schaeffler | 403/26 |
| 4,960,335 | 10/1990 | Otto et al. | 384/484 |
| 5,017,025 | 5/1991 | Williams | 384/584 |
| 5,058,262 | 10/1991 | Brockmüller et al. | 384/571 |

OTHER PUBLICATIONS

"Temken Tech Note", The Timken Company, Sep. 1993.

Primary Examiner—Lenard A. Footland
Attorney, Agent, or Firm—James L. Bean

[57] ABSTRACT

Disclosed is a double row tapered roller bearing assembly employing a contoured, maximum journal-contact bearing seal wear ring especially adapted to be installed on a journal at the end of a shaft or axle with the wear ring providing an interference fit contact area engaging the journal over at least a major portion of the axial length of the wear ring. Stress risers are eliminated by providing smooth contoured surface junctures to thereby substantially reduce fretting wear on the journal, with the increased contact area facilitating heat transfer to the shaft to extend seal life.

16 Claims, 5 Drawing Sheets

SHAFT JOURNAL BEARING ASSEMBLY IMPROVED SEAL WEAR RING

FIELD OF THE INVENTION

This invention relates to an improved bearing assembly for use on a shaft or axle journal and more particularly to such a bearing assembly employing a seal wear ring which provides maximum journal contact to reduce fretting and extend bearing and journal life and facilitates heat transfer from the seal to the shaft to thereby increase lubricant and seal life.

DESCRIPTION OF THE PRIOR ART

Roller bearing assemblies incorporating two rows of tapered roller bearings preassembled into a self-contained, prelubricated package for assembly onto journals at the ends of axles or shafts are well known. Such bearing assemblies are widely used, for example, as rail car bearings assembled onto journals at the ends of rail car axles and the present invention will be described with reference to such rail car bearings, it being understood that the bearings may be employed on shaft journals for various uses. Bearings of this type typically employ two rows of tapered roller bearings fitted one into each end of a common bearing cup with their respective bearing cones having an inner diameter dimensioned to provide an interference fit with the shaft journal and with a cylindrical sleeve or spacer positioned between the cones providing accurate spacing on the journal. Seals mounted within each end of the bearing cup provide sealing contact with wear rings bearing against the outer ends of the respective bearing cones at each end of the assembly. The wear rings are also dimensioned to provide an interference fit with the journal so that the entire assembly can be pressed as a unit onto the end of the shaft journal.

In a typical rail car installation, the axle journal is machined with a fillet at the inboard end of the journal and a backing ring is machined to accurately fit the contour of the fillet and engage the inboard wear ring to accurately position the bearing assembly. An end cap mounted on the end of the axle by bolts threaded into bores in the axle engages the outboard wear ring and clamps the entire assembly on the end of the axle and applies an axial load to the assembly between the fillet and the end cap. Bearings of this type are well known, one such bearing being illustrated, for example, in U.S. Pat. No. 3,494,682.

Since the wear rings and bearing cones are dimensioned to provide an interference fit with the axle journal, the bearing assembly must be installed on the journal by a pressing operation. The American Association of Railroads (AAR) has standard specified loadings for pressing various classes of bearings onto the respective axle journals to properly seat the bearings. For example, for a class F bearing, the specified loading is 50 tons ±5 tons, with the press loading being maintained for 5 seconds to assure proper seating of the bearing against the backing ring and the backing ring against the fillet. Upon removal of this seating force, a residual load will be retained between the inboard seal wear ring and the backing ring as a result of the frictional resistance produced by the interference fitted bearing components. Based on the theoretical model employed, this residual force for a F class bearing should be approximately 30 tons. The bearing stack is thus retained under approximately a 30 ton compressive force tending to maintain the seated clamp force at the inboard wear ring once the assembly is put into service and the bearing component stack seeks internal force equilibrium under dynamic load.

Failure to achieve and/or maintain bearing clamping force within the designed range, or bearing retention range, in service will result in the bearings experiencing excessive face wear between adjacent components, especially on the side of the bearing nearest the wheel where journal bending is greatest. This is particularly true under conditions of high loading where components can separate under tensile loading as the rotating journal bends under load. Face wear further reduces the lateral dimensional stackup of the bearings, and consequently the clamping force, which results in accelerated component face wear that may ultimately lead to loose bearing components, damaged raceways and costly repairs or even catastrophic bearing failure.

Relative movement between the seal wear rings and the supporting journal surface also results in fretting of the axle journal surface, particularly under inadequate bearing clamping and high loading conditions, ultimately leading to costly journal repair or even axle replacement. Since net freight tonnage and therefore gross rail load (GRL) of in-service freight cars has increased substantially in recent years, the problems associated with both component face wear and journal fretting have become more critical to overall service life.

Bearing clamp retention can also be adversely affected by excessive heat buildup in the seal wear ring as a result of friction between the rubbing seal and the external surface of the wear ring. The prior art seal wear rings contacted the supporting journal only over a relatively short portion of their axial length sufficient to center the wear ring on the axle journal and within the relatively rotating seal surface. Since the prior art wear rings were spaced from the journal surface throughout a major portion of their axial length, heat transfer from the metal of the wear ring to the heat sink of the journal and the adjacent wheel structure was relatively slow, sometimes resulting in a substantial temperature differential between the wear ring and the journal surface. As a result, the wear ring expands relative to supporting the journal surface thereby reducing the clamping force retention to aggravate the face wear and journal fretting conditions.

One proposal to solve the journal fretting problem is illustrated in U.S. Pat. No. 5,017,025 which discloses the use of a seal wear ring having an internal surface which is spaced from the journal throughout the axial length of the wear ring. In this arrangement, a recess or countersink in the backing ring engaging the adjacent end portion of the wear ring is relied on to retain the wear ring concentric with respect to the journal axis. Absence of contact between the wear ring and the journal results in no clamping force retention due to the wear ring and can lead to excessive face wear.

Bearings employed on rail transit cars typically are mounted inboard of the car wheels, with the outboard seal wear ring bearing against the wheel hub and the inboard wear ring bearing against a backing ring abutting a shoulder on the axle. In such installations, the axle is typically formed with an annular, generally arcuate groove or recess adjacent the axle shoulder and adjacent the wheel hub with a portion of the axial length of the seal wear rings overlying these recesses. In one such installation which has been in commercial use since at least as early as 1989, the outboard seal wear ring had a uniform cylindrical surface throughout substantially its entire length, with the inner diameter of this wear ring providing an interference fit with the axle journal. This outboard seal wear ring overlies the arcuate groove in the axle and is out of contact with the journal surface for approximately half its axial length at the end abutting the wheel hub. The inboard seal wear ring employed on this commercial bearing assembly is in contact with the journal over only approximately 20% of its axial length at the end thereof abutting the bearing cone.

SUMMARY OF THE INVENTION

In order to overcome the foregoing disadvantages of the prior art two-row tapered roller bearing assemblies, the bearing assembly of the present invention employs an improved seal wear ring which bears upon and provides an interference fit with the axle journal over a major portion of its axial length. The increased contact surface between the wear ring and journal provides greater clamp force bearing retention. Abrupt surface contact changes on the wear ring surface contacting the journal are eliminated to minimize stress concentration and fretting, and the maximum contact surface provides improved heat transfer from the seal wear surface into the underlying heat sink of the journal axle and wheel. By providing increased initial clamp force retention, conventional clamping by the cap screws and end cap results in greater total clamping force retained in the bearing element stack after the bearing is put in service under load and bearing clamp load is dynamically equalized in service.

BRIEF DESCRIPTION OF THE DRAWINGS

Other features and advantages of the invention according to the present invention will be apparent from the detailed description contained hereinbelow, taken in conjunction with the drawings, in which.

DESCRIPTION OF THE PREFERRED EMBODIMENT

Figure 1:
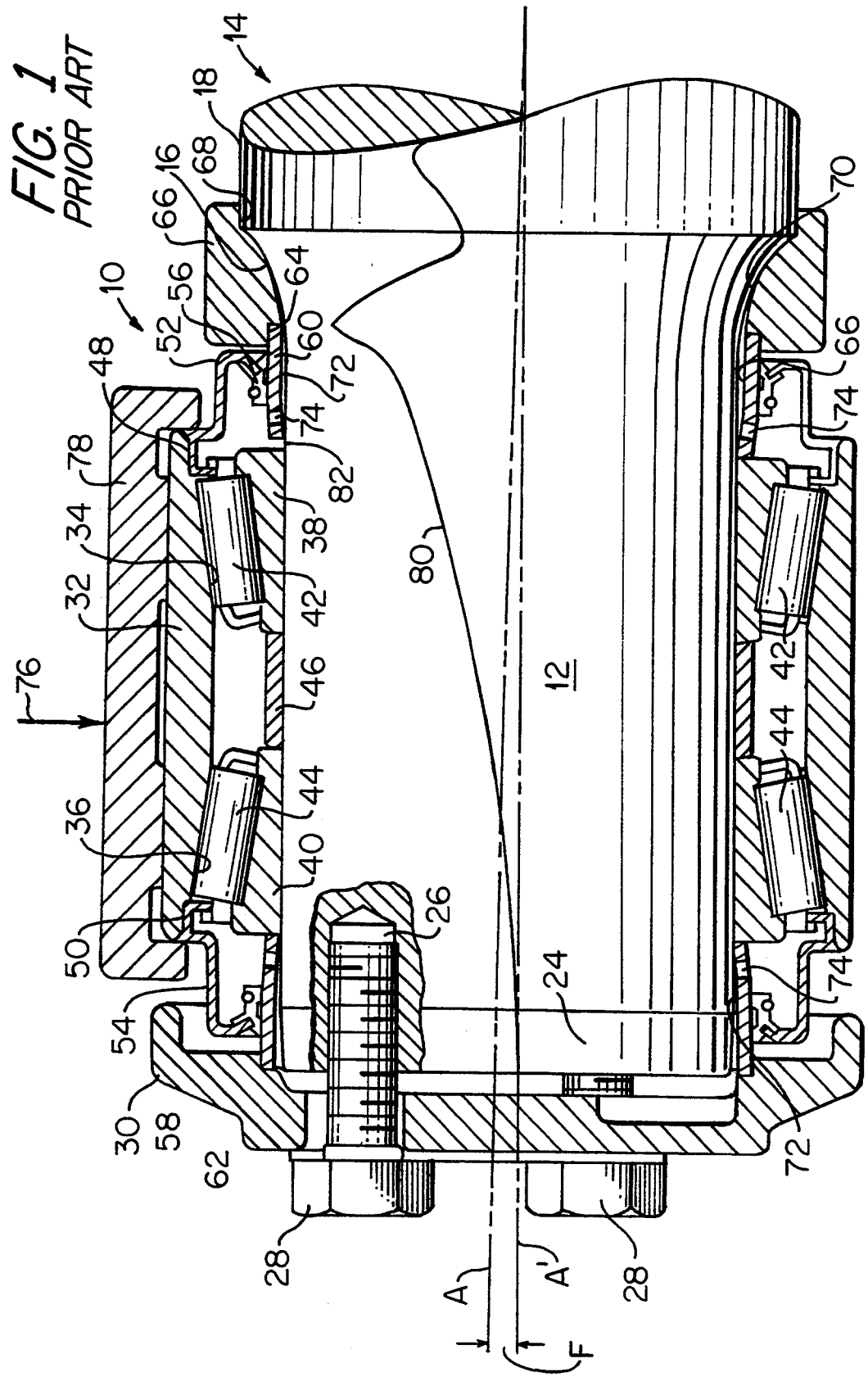
FIG. 1 is an elevation view, partially in section, of a prior art tapered roller bearing assembly mounted on an axle journal and illustrating a superimposed stress profile and bending profile under load.

Referring now to the drawings in detail, a bearing assembly indicated generally by the reference numeral 10 in FIG. 1 is shown mounted on a journal 12 on the free, cantilevered end of a shaft or axle 14, typically a rail car axle. Journal 12 is machined to very close tolerances and terminates at its inner end in a contoured fillet 16 leading to a cylindrical shoulder portion 18 of axle 14. Shoulder 18 is joined to the body of axle 14 through a chamfer or fillet 16. At the opposite or free end of the axle, journal portion 14 terminates in a slightly conical or tapered guide portion 24 dimensioned to facilitate installation of the bearing assembly onto the journal. A plurality of threaded bores 26 are formed in the end of journal 14 for receiving threaded cap screws or bolts 28 for mounting a bearing retaining cap 30 on the end of the shaft to clamp the bearing in position as described more fully hereinbelow.

The bearing assembly 10 is preassembled before being mounted on journal 12 and clamped thereon by end cap 30. The bearing assembly includes a unitary bearing cup 32 having a pair of raceways 34, 36, formed one adjacent each end thereof which cooperate with a pair of bearing cones 38, 40, respectively, to support the two rows of tapered roller bearings 42, 44, respectively, therebetween. A center spacer 46 is positioned between cones 38, 40 to maintain the cones in accurately spaced relation relative to one another.

The bearing cup 32 is provided with cylindrical counterbores 48, 50 at its opposed ends outboard of the raceways 34, 36, and a pair of seal assemblies 52, 54 are pressed one into each of the cylindrical counterbores 48, 50. The seals 52, 54 include resilient sealing elements 56, 58, respectively, which rub upon and form a seal with a pair of seal wear rings 60, 62, respectively, having their inwardly directed ends in engagement with the outwardly directed ends of bearing cones 38, 40, respectively. The other end of wear ring 60 is received in a cylindrical counterbore 64 in the axially outwardly directed end of an annular backing ring 66 which, in turn, has a counterbore 68 at its other end which is dimensioned to be received in interference relation on the cylindrical shoulder 18 of shaft 14. The counterbore 64 and the outer diameter of the wear ring 60 are also dimensioned to provide an interference fit so that the wear ring is pressed into and retained in concentric relation with the backing ring. Backing ring 66 is accurately machined to provide a contoured inner surface 70 complementary to and engaging the contour of fillet 16 when the bearing is mounted on the shaft.

The bearing as thus far described is conventional in the rail car bearing art. As shown in FIG. 1, the known seal wear rings 60, 62 conventionally have a stepped inner surface including a larger diameter portion providing a void or space indicated at 72 between the inner surface of the wear rings and the journal over a substantial portion of their axial lengths and a smaller diameter portion which circumferentially contacts the axle journal to achieve an interference fit within prescribed tolerances. The contact length of such prior art wear rings with the journal is relatively small, typically under 20% of the overall axial length of the wear rings, but is sufficient to accurately center the wear ring with respect to the axle journal to provide the radial lip seal with a concentric contact area on the outer cylindrical surface of the wear ring so that the resilient sealing elements 56, 58 bear uniformly on the outer surface of the seal wear rings 60, 62 during relative rotation. Openings 74 through wear rings 60, 62 vent the spaces 72 and the bearing cavity. These openings 74 and the spaces 72 were considered desirable to enable relubrication of the prior art bearings in service.

Bearings of the type just described are mounted on the journal and seated by applying an axial force to the outwardly directed end face of the outboard bearing seal ring 62 which transmits the load to overcome the interference fit between the journal 12 and all of the components in the stack to firmly seat the assembly against the fillet 16. In a class F rail car bearing, this seating force is 50 tons±5 tons, with the force being retained for at least 5 seconds to assure proper seating of all of the elements. As previously stated, upon removal of the seating force, a residual load of approximately 30 tons will be retained between the backing ring 66 and wear ring 60 for a class F bearing and approximately 30 tons of clamping force can be applied through the end cap 30 upon tightening the bolts 28 to 30 tons of clamping force on the entire bearing stack between the cap and the backing ring.

Still referring to FIG. 1, due to the cantilever arrangement, the journal 12 is bent downward at its free end under load indicated by the arrow 76 applied by the rail car's side frame through the adapter 78. During movement of the rail car and consequent rotation of the axle 14, the downward bending movement, or journal flexure, occurs dynamically, i.e., the journal 12 is always bent downwardly as it rotates about its axis. The normal unloaded axis of the journal is indicated by the broken line A and the axis under load 76 is indicated at A', with the deviation, or flexure being indicated at F, this bending being exaggerated in FIG. 1 for purposes of illustration. The bending moment induced in the axle to produce this flexure produces a stress profile in the journal which varies along its length due, in part, to geometric changes. The stress profile is indicated in FIG. 1 by the superimposed curve 80 from which it can be seen that the maximum stress occurs in the area of the seal wear ring 60, backing ring 66, and fillet 16. Since the relative bending moment and stress is substantial at the area where wear ring 60 contacts the journal surface, dynamic flexing of the journal under conditions of insufficient bearing clamp will result in relative axial movement between the journal and wear ring at the top portion which is under tension. This can ultimately lead to fretting damage to the journal surface in the area of the end of the contact surface of the wear ring and at the chamfer joining the contact surface with the enlarged portion of the wear ring.

The total journal deflection relative to the center of the rail car wheel for an F class journal and bearing operating under maximum AAR recommended load can be as much as 0.008 inches. When flexure of this magnitude is experienced under conditions of insufficient bearing clamp, a change of bearing component geometry can yield a gap, indicated at 82, of up to about 0.0008 inches which will produce fretting of the journal surface at the prior art journal wear ring contact area. At the same time, wear will be experienced at the contact area between the end face of bearing cone 38 and the end of wear ring 60. This face wear will inherently further reduce the bearing clamp retention, thereby enlarging the gap 82 and further aggravate the fretting condition.

Figure 2:
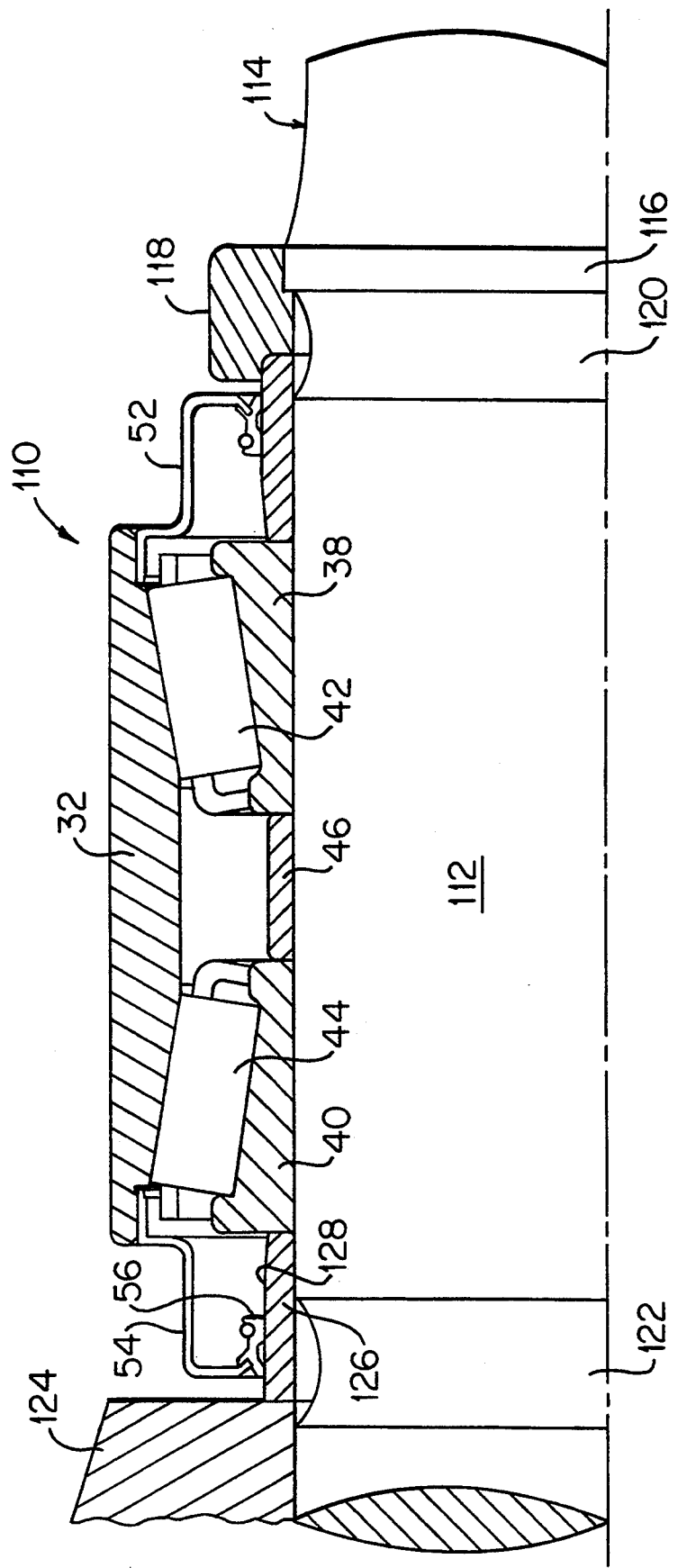
FIG. 2 is a fragmentary, sectional view of another prior art tapered roller bearing assembly which has been used on rail transit cars.

Referring to FIG. 2, the transit bearing assembly indicated generally at 110 is shown mounted on the journal portion 112 of a rail car axle 114. A radial shoulder 116 abuts and axially positions a backing ring 118. An annular arcuate-shaped relief groove 120 is formed around axle 114 adjacent to and immediately outboard of the shoulder 116, and a similar annular arcuate groove 122 is formed at the outboard end of journal portion 112 adjacent the wheel hub, a portion only of which is illustrated at 124. The bearing cup, bearing cones, center spacer, tapered rollers and seal elements may be identical to that described hereinabove with respect to FIG. 1 and like reference numerals are employed in FIGS. 1 and 2 to designate such parts. Also, the inboard seal wear ring 60 is identical in both the FIGS. 1 and 2 assemblies. The outboard seal wear ring 126 shown in FIG. 2 is different, however, and comprises an annular ring having a substantially right circular cylindrical inner surface throughout substantially its full axial length. Ring 126 also has a substantially cylindrical outer surface throughout a major portion of its axial length on the outboard end portion thereof, with the outer surface being tapered slightly at its other end, as at 128, to facilitate insertion of the wear ring 126 through the seal element 56.

As can be readily seen from FIG. 2, the seal wear ring 126 is out of contact with the axle journal in the area of its end face which abuts the wheel hub 124 so that journal fretting in this area due to relative movement between the journal and wear ring is not a problem. Fretting of the bearing surface could occur, however, in the area of the inboard end of wear ring 126, i.e., the end which abuts the bearing cone 40 in the same manner described hereinabove with respect to FIG. 1.

While wear ring 126 is described as having a substantially cylindrical inner surface, it should be understood that the conventional chamfer, or short radius curve would be employed at the intersection of the inner surface and the end faces of the wear ring to break the sharp edge.

Figure 3:
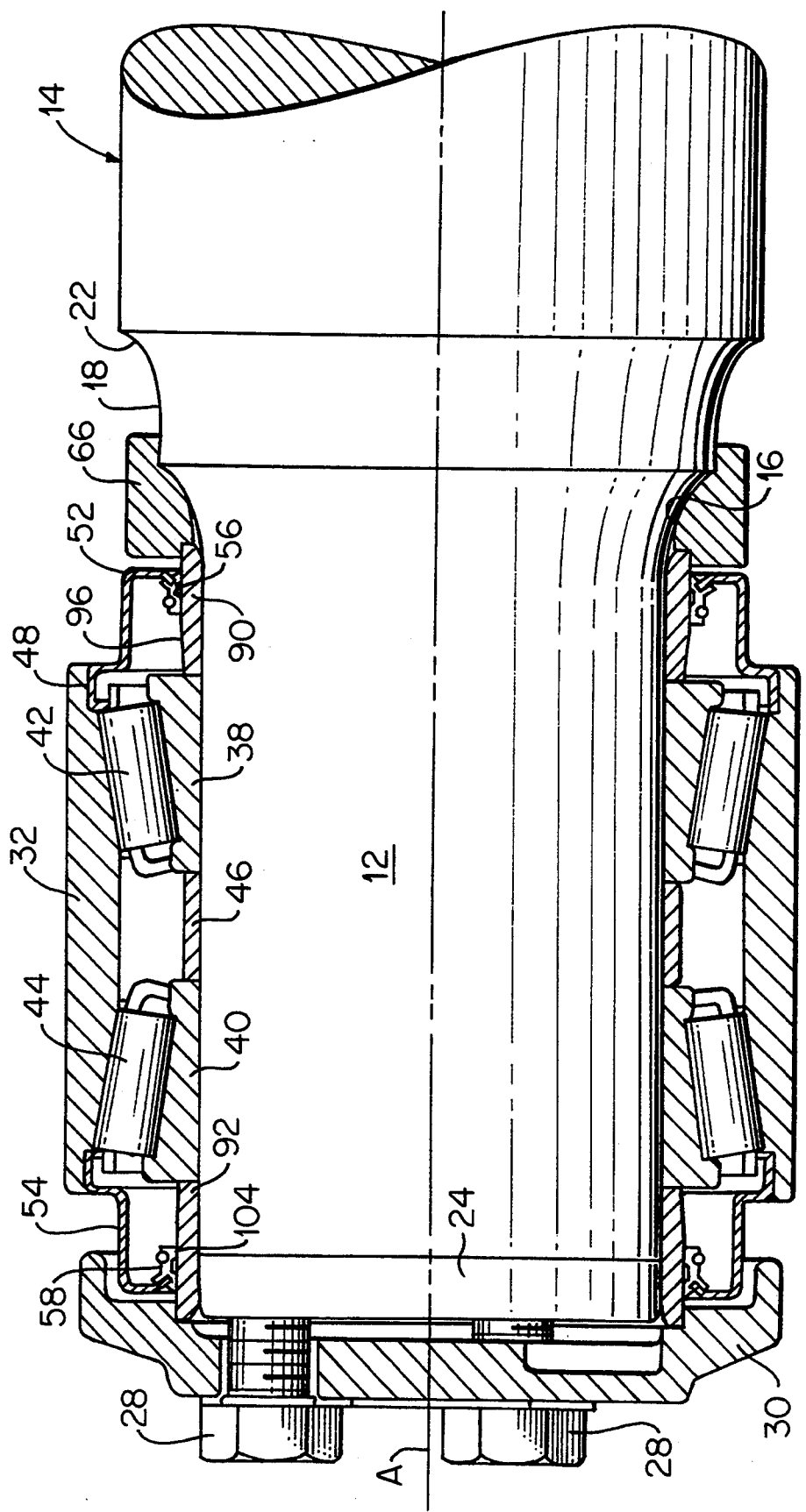
FIG. 3 is an elevation view, partially in section, of a tapered roller bearing assembly according to the present invention mounted on an axle or journal.

Tests indicate that face wear between adjacent bearing components and fretting wear on the axle journal can be substantially reduced or eliminated in accordance with the present invention which enables the retention of greater bearing clamp force due to the compressive strain in the bearing components. This is accomplished by employing an improved seal wear ring illustrated in FIGS. 3 and 4 of the drawings. In these figures, the axle, journal and all components of the bearing assembly other than the seal wear ring are identical to those described hereinabove with respect to the prior art illustrated in FIG. 1. Also, the inboard and outboard bearing wear seals 90, 92, respectively, may be identical in construction and are mounted on journal 12 in mirror image relation one at each end of the bearing as shown in FIG. 3.

Figure 4:
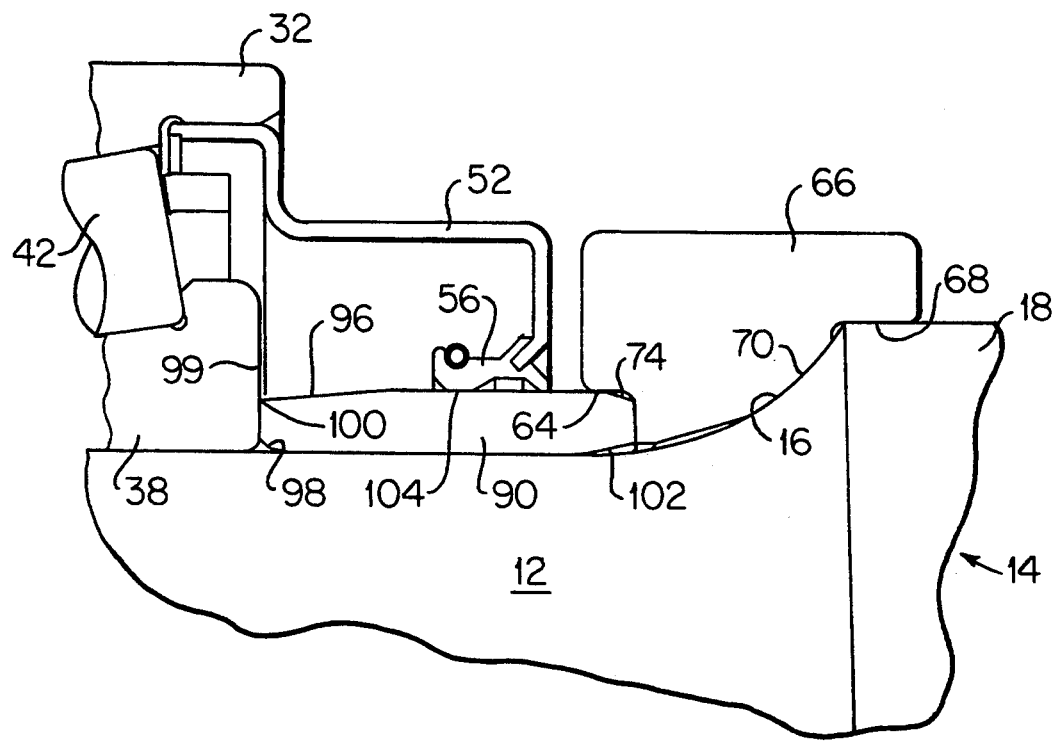
FIG. 4 is an enlarged fragmentary view of a portion of the structure illustrated in FIG. 3.

As most clearly seen in FIG. 4, the wear ring seal 90 is a substantially full contact, contoured ring having a minimum inner diameter dimensioned to provide a prescribed interference fit with the external diameter of journal 12. The inboard end of ring 90 fits into the counterbore 64 in backing ring 66 with a prescribed interference fit, with the mating end faces of the counterbore and the ring 90 being in parallel abutting relation. A chamfer 94 is formed on the end of ring 90 to avoid interference with the unavoidable small radius at the inner section of the cylindrical sidewall and planar base formed by the counterbore in the backing ring. The outer surface of ring 90 is also provided with a straight conical taper on its outboard end as shown at 96 to facilitate telescoping movement of the resilient element 56 of the seal 52 onto the outer surface of the wear ring.

The intersections of the outboard end face of wear ring 90 and its inner and outer surfaces respectively, are curved at a relatively large radius as indicated at 96, 98 to provide a smooth contoured surface attenuating the edge stress in the area contacting the end face 99 of cone 38 and the cylindrical surface of journal 12. Preferably, the radius of curvature of the surface portion adjacent the inner diameter is at least equal to or greater than the radius of curvature adjacent the outer diameter with the radius of curved surface 98 being sufficiently high to provide an outwardly flared smooth transition surface which substantially eliminates edge stress at the point of contact with the journal.

The inner diameter of ring 90 is attenuated at its outboard end by providing an outwardly flared or curved surface having a much larger radius of curvature as indicated at 102. This large radius of curvature not only provides a very smooth transition in the area where the journal bearing stress is near its highest as shown by the stress profile in FIG. 1, but also avoids any contact with the journal in the area of the journal's rising profile at the fillet 16. Further, the relief provided by the curved surface 102 is sufficient to avoid such contact between the wear ring and shaft fillet after reworking or reconditioning of the bearings wherein the backing ring 60 can be resurfaced by machining an amount sufficient to position the backing ring axially inward by as much as 0.03 inches which, in turn, results in the wear ring 90 and the entire bearing assembly being moved inward a corresponding amount.

Between the radius 98 and the radius 102, the generally cylindrical inner surface of the wear ring 90 preferably is contoured such that, in axial section, the surface is defined by a very long radius of curvature with the result that the inner diameter is slightly larger adjacent each of the curved surfaces 98, 102, than at a point midway therebetween. This surface portion is thus a surface of revolution generated by rotating an arc of a circle about the axis of the seal wear ring, with the arc having a very long radius with its center located outside the wear ring. This radius of curvature ideally would accommodate deflection of the axle, with the degree of deflection being determined from the point of the radial center of the axle and the lateral center of the railroad wheel, and the relative slope of deflection would vary with the shape of the axle within this distance.

Load studies have shown that, for a 286,000 lb. maximum GRL permitted by AAR specifications for a F class bearing, the relative slope within the length of the inboard wear ring seal 90 (which is 1.869±0.03 inches) spans from 0.00033 inches to 0.00048 inches with an associated journal deflection of 0.001 inches across the length of the wear ring. Thus, the ideal contour would be shaped so that, under maximum load, the wear ring interference fit is maintained within the prescribed AAR regulations while stress points at either lateral end of the inner diameter of the contoured ring in the compression phase of each rotational cycle of the journal are avoided. The interference fit of such an ideally convexly contoured inner wear ring surface would be reduced in the tensile zone of each cycle but still remains within the prescribed limits, and no fretting wear would occur at the apex of the contour on the inner diameter of the wear ring since no relative movement would occur at the apex.

In practice, the extremely slight curvature of such a contoured inner surface might be difficult to achieve within conventional manufacturing tolerances, and a cylindrical surface may be substituted between the arcuate surfaces 98 and 102 without materially affecting the performance of the wear ring. In any event, in order to obtain full benefit of the reduced fretting achieved according to this invention, it is essential to provide an interference fit along substantially the full length of this generally cylindrical surface to achieve the improved bearing clamp. It has been found that for a class F railroad bearing, increasing the contact length between the inner surface of the wear ring 90 and the journal surface to at least about 75% and preferably about 80% of the wear ring length will result in a substantial increase in bearing clamp retention as a result of the increased static and dynamic friction between the wear ring and journal surfaces. This increased friction will, of course, result in a slight reduction in the seating force felt at the backing; however the static resistance to break-away of the component stack is higher and the resistance to rebound is increased even at a lesser interference fit within the range allowed by AAR regulations.

Figure 5:
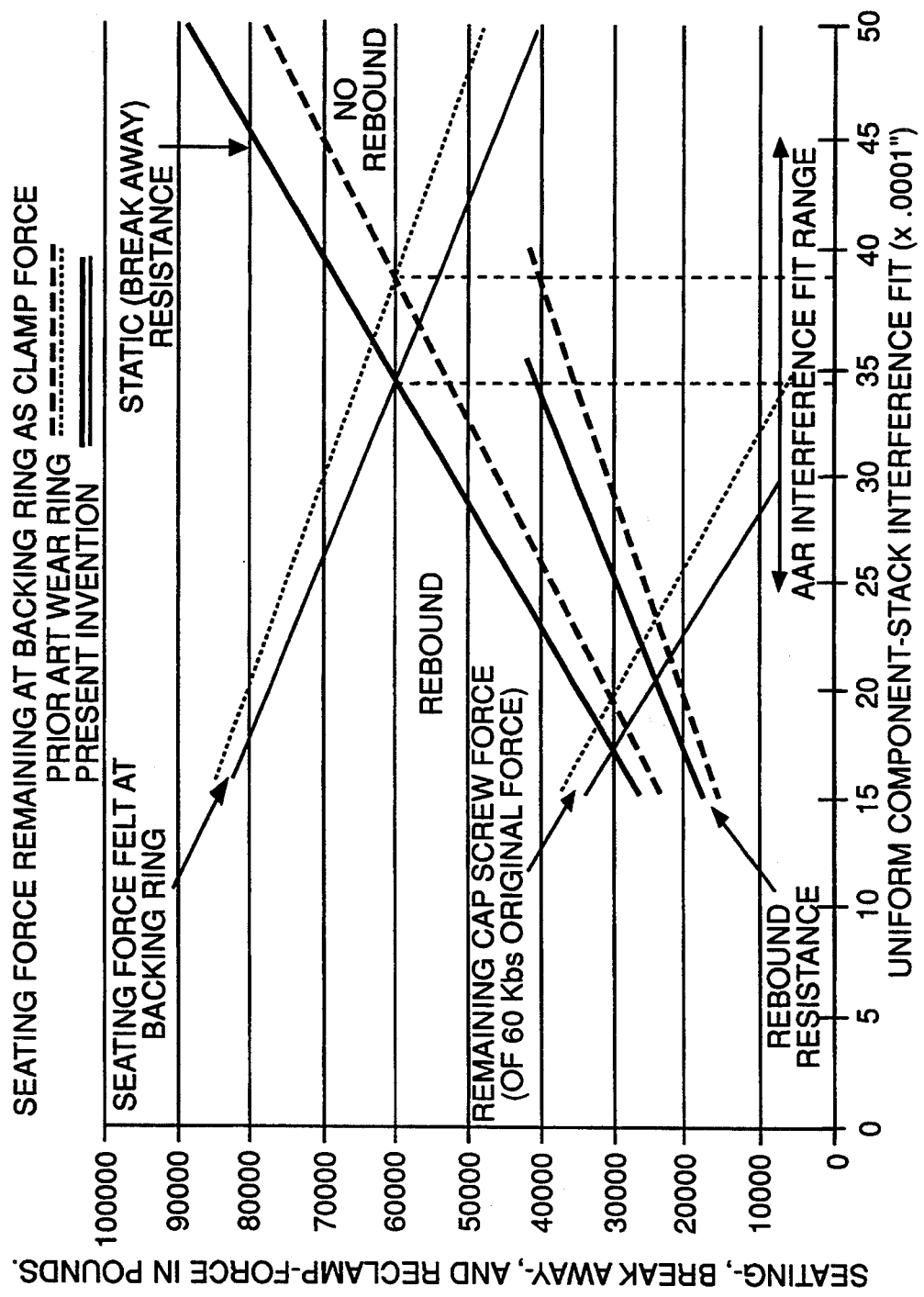
FIG. 5 is a graphical representation of the magnitude of bearing clamp force after pressing and seating of the bearing assembly of the present invention as compared with the prior art assembly.

Referring to FIG. 5, and assuming a theoretically possible uniform component stack interference fit of 0.0025 inches, during the seating operation in which 50 tons of seating force is applied, 70,000 lbs. of force will be asserted at the backing ring with a full contact, contoured wear ring according to the present invention. When the seating force is released, a portion of this force will be set free by the backing ring, since the break-away force is only 46,000 lbs. The component stack will rebound until the dynamic frictional resistance stops movement, with the remaining force of 30,000 lbs. being retained at the backing ring as compared to 27,000 lbs. for the prior art ring. As is known, the application of the cap screws to the end cap would not contribute any additional clamp force which is felt at the backing ring in either case, i.e., whether 27,000 or 30,000 lbs. is retained.

For a more common, mid-range interference fit of 0.0035 inches, it is seen from FIG. 5 that for the same seating load on the assembly employing the improved wear ring, 58,000 lbs. will be felt at the backing ring while the break away force will have increased to 63,000 lbs., i.e., a level above the seating force felt. Consequently, the 58,000 lb. seating force will be held at the backing ring and the component stack will not rebound. In contrast, the prior art wear ring having identical interference fits would allow a seating force of 64,000 lbs. to be felt at the backing ring, with a break away or static resistance of only 55,000 lbs. Thus, at press release, the 64,000 lb. force at the backing ring will rebound the component stack until a 38,000 lb. force is felt at the backing ring, as determined by the dynamic frictional resistance of the components involved. Thus, it is seen that a 20,000 lb. increase in retained clamping force is achieved with the same interference fit using the seal wear ring in accordance with the present invention.

Tests have shown that temperature at the interface of a radial lip seal and the seal wear ring can vary widely. At 500 rpm, Viton seals can generate temperatures in excess of 300° F. at the interface 104 as seen in FIG. 4 while low temperature radial lip seals may run at or below 140° F. at the interface. Bearings with no seal contact may find an equilibrium temperature in the range of 110° F. Using conventional seals with the prior art wear rings illustrated in FIG. 1, excessive heat from high temperature seals is believed to be dissipated from the wear ring in roughly equal amounts into the adjacent bearing cone, the bearing journal, and the backing ring or end cap contacting the ring. Despite this dissipation, high temperature seals could result in a wear ring reaching relatively high temperatures which produce internal bearing temperatures in excess of the threshold temperature for the beginning of oxidation of AAR approved greases. In addition, prior art wear ring temperatures can rise rapidly as the point of contact with the seal is axially spaced from the area in contact with the heat sink, while the bearing temperatures may remain low for a period of time. Under these conditions, it is possible that a wear ring having an interference fit at or near the low permissible range of 0.0025 inches will expand to the point of losing interference contact with the underlying axle journal. Such loss of contact and a consequent further reduction in heat transfer and can result in a further substantial increase in the wear ring temperature. For example, in a class F bearing prior art wear ring having a diameter of 6.1875 inches, and a coefficient of thermal expansion of 0.00000622 inches per inch, a temperature differential of 70° F. between the axle journal and the wear seal will produce the wear ring diameter expansion of 0.0027 inches, an amount greater than the minimum permissible interference fit whereby intimate contact could be lost. In contrast, with the seal ring of the present invention which is in contact with the heat sink of the journal directly underneath the seal-wear ring interface 104, a greater portion of the heat is transferred to the larger heat sink of the journal, axle and adjacent wheel, thus producing both a lower wear ring temperature and a higher axle temperature directly beneath the wear ring so that the two temperatures are closer to equilibrium. While this benefit is greater for the inboard seal wear ring, the direct contact beneath the interface similarly benefits the outboard wear ring despite the conventional tapered surface at the end of the journal. Thus, a further benefit is achieved by the continuous contact seal wear ring according to the present invention.

Since rail car axles are relatively expensive items, procedures have been developed to repair axles which have been damaged due to fretting. This repair is made in accordance with AAR proposed standard procedures which include machining an arcuate groove around the axle to remove the damaged area. The arc of the groove has a radius of 0.75 inches and the groove is cut only to a depth sufficient to remove or clean up any worn grooves due to fretting, with the maximum permissible depth of the arcuate cut being ⅛ inch. The machined groove is then cold rolled in accordance with specified procedures in which the rolling pressure is reduced toward the ends of the groove and finally the edges of the groove, i.e., the intersection of the rolled groove with the original journal surface, are polished to provide a smooth surface and to remove any buildup of metal.

Figure 6:
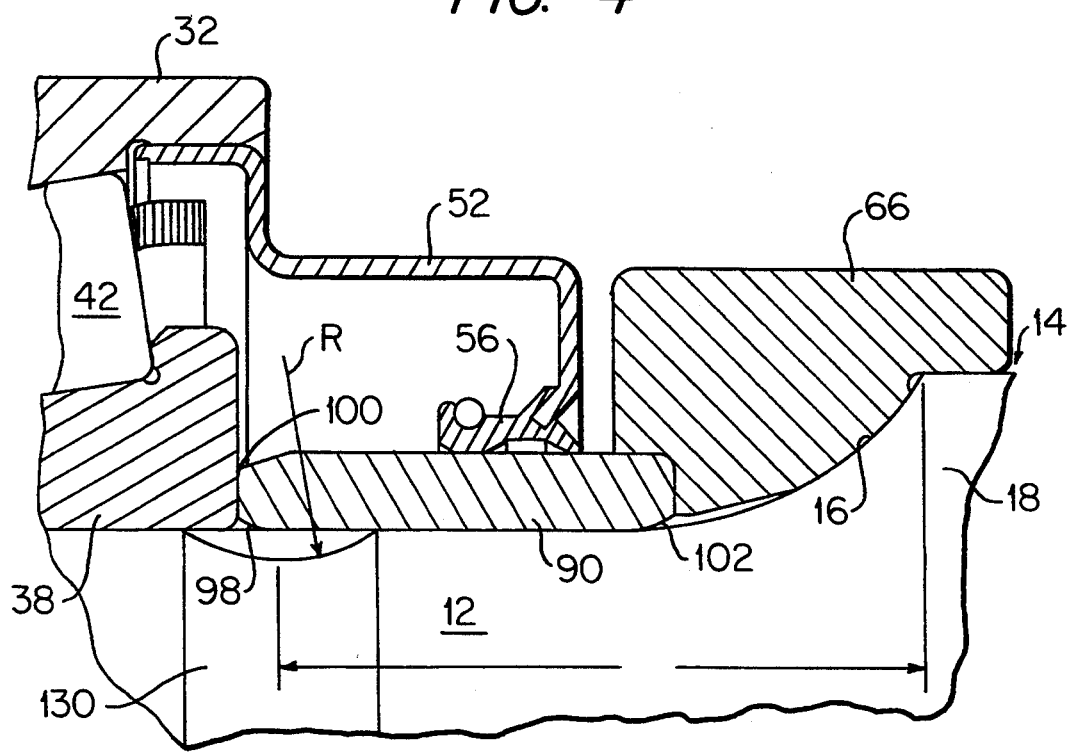
FIG. 6 is a fragmentary, sectional view illustrating the bearing assembly of the present invention employed on an axle journal which has been repaired according to AAR approved procedures.

Referring to FIG. 6, an axle 14 which has been repaired by forming a maximum acceptable size repair groove 130 is illustrated, with a bearing assembly including a seal wear ring 90 in accordance with the present invention mounted thereon. The repair groove 130 is machined at the standard distance d from the line of intersection of the fillet 16 and shoulder 18, with the groove having a standard radius R.

Groove 130 is illustrated as having a maximum permissible depth with the result that the width of the groove axially along the surface of journal 12 will be such that the prior art wear ring 60 illustrated in FIG. 1 would be out of contact with the journal surface along its full length. In such circumstances, the countersink 64 in backing ring 66 is relied upon entirely for centering the prior art wear ring 60 with respect to the longitudinal axis of the shaft 14. It has been found, however, that loss of contact between the seal wear ring and the journal surface can result in an increased eccentricity between the journal axis and the seal outer surface which may adversely effect performance and life of the seal. For example, the outer surface of a standard wear ring, after being mounted on the supporting journal, may have a total deviation from a true circle of about 0.0080 inches. This out-of-roundness will be reduced to about 0.001 inches when mounted on the journal with the standard interference fit.

It is apparent that loss of contact between the wear ring and the journal (as in the case of the standard prior art wear ring used on a repaired axle) will result in loss of the improved roundness due to the interference fit. As a consequence, the more out-of-round wear ring outer surface will result in less uniform contact and more rapid wear of the seal element 56. At the same time, it is apparent that the wear ring seal according to the present invention may be employed with a repaired axle without losing the benefit of the journal contact providing a more concentric, circular outer surface of the wear ring in contact with the bearing seal. This improved concentricity provided by the present invention enhances seal life and efficiency.

As is apparent from FIG. 6, seal wear ring 90 is in contact and provides an interference fit with the journal surface 12 inboard of the repair groove 130. This contact area extends for a distance of at least about one half the axial length of the wear ring and the contact area extends beneath the seal contact area whereby improved concentricity is achieved in the seal area.

While a preferred embodiment of the invention has been disclosed and described in detail, it should be apparent that the invention is not so limited but rather it is intended to include all embodiments which would be apparent to one skilled in the art and which come within the spirit and scope of the invention.

What is claimed is:

1. In combination with an axle having a shoulder spaced from a free end and a journal of smaller diameter extending from the shoulder to the free end, an improved bearing assembly fitted onto the journal and retained thereon by an end cap mounted on said free end to permit relative rotation between the axle and an element supported by the bearing, said bearing assembly comprising an inboard bearing cone and an outboard bearing cone mounted on said journal in axially spaced relation to one another, each said cone defining an outwardly directed, tapered inner raceway and each having an inner diameter providing an interference fit on said journal, a cylindrical spacer element mounted on said journal between said bearing cones and maintaining said bearing cones in axially spaced relation, a bearing cup defining a pair of inwardly directed tapered outer raceways located one in radially outward spaced relation to each of said inner raceways, rolling elements located between the inner and outer raceways, a backing ring mounted on said journal and engaging said shoulder in a manner to radially fix the backing ring on the axle, a first seal wear ring mounted on said journal and having a first end surface engaging said backing ring and a second end surface engaging said inboard bearing cone and a second seal wear ring mounted in contact with the said outboard bearing cone and said end cap, and a pair of annular seal elements interposed one between said bearing cup and each of said seal wear rings forming a lubricant barrier at each end of the bearing, said first seal wear ring having an inner generally cylindrical surface extending over a major portion of its axial length, said generally cylindrical inner surface having a diameter providing an interference fit with said journal and terminating at each end in a smoothly curved, outwardly flared surface portion.

2. The invention defined in claim 1 wherein said shoulder includes a fillet and wherein said backing ring has a curved surface complementary to and engaging said fillet to radially fix said backing ring on said axle, said backing ring further including an axially outwardly directed counterbore receiving and providing an interference fit with the axially inner end portion of said first seal wear ring.

3. The invention defined in claim 1 wherein said second end surface of said first seal wear ring terminates at its radially outer portion in a smoothly curved segment.

4. The invention defined in claim 1 wherein said outwardly flared surface at the end of said first seal wear ring engaging said first bearing cone is attenuated into said second end surface of said first seal wear ring.

5. The invention defined in claim 4 wherein said generally cylindrical surface extends for a distance equal to at least about 75% of the total axial length of said first seal wear ring.

6. The invention defined in claim 5 wherein said generally cylindrical surface is the surface of a right circular cylinder.

7. The invention defined in claim 6 wherein said generally cylindrical surface extends for a distance equal to at least about 80% of the total axial length of said first seal wear ring.

8. The invention defined in claim 5 wherein said generally cylindrical surface is a surface of revolution generated by rotating an arc about the axis of said first seal wear ring, said arc having its radial center outside said first seal wear ring.

9. The invention defined in claim 8 wherein said generally cylindrical surface extends for a distance equal to at least about 80% of the total axial length of said first seal wear ring.

10. The invention defined in claim 8 wherein said second seal wear ring has an inner generally cylindrical surface extending over a major portion of its axial length, said generally cylindrical surface having a diameter providing an interference fit with said journal.

11. The invention defined in claim 10 wherein said first and said second seal wear rings are substantially identical and are mounted on said journal in mirror image relation to one another.

12. The invention defined in claim 1 wherein said second seal wear ring has an inner generally cylindrical surface extending over a major portion of its axial length, said generally cylindrical surface having a diameter providing an interference fit with said journal.

13. The invention defined in claim 12 wherein said generally cylindrical surface of said second seal wear ring terminates at each end in a smoothly curved outwardly flared surface portion.

14. The invention defined in claim 1 further comprising a fretting damage repair groove formed in said journal surface adjacent said inboard seal wear ring, said repair groove extending beneath the outboard end portion of said inboard seal wear ring, said generally cylindrical surface of said inner seal wear ring extending in overlapping relation to at least a portion of said repair groove, and said inner cylindrical surface of said inner seal wear ring providing an interference fit with said journal surface inboard of said repair groove.

15. The invention defined in claim 14 wherein said interference fit inboard of said repair groove extends over at least one half the length of said inner seal wear ring.

16. The invention defined in claim 15 wherein said seal contacts said seal wear ring in an area radially outward from the area of the seal wear ring in contact with the journal surface.

* * * * *